US008626686B1

(12) United States Patent
Rhodes

(10) Patent No.: US 8,626,686 B1
(45) Date of Patent: Jan. 7, 2014

(54) INVARIANT OBJECT RECOGNITION

(75) Inventor: Paul A. Rhodes, Palm Beach, FL (US)

(73) Assignee: Evolved Machines, Inc., West Palm Beach, FL (US)

( * ) Notice: Subject to any disclaimer, the term of this patent is extended or adjusted under 35 U.S.C. 154(b) by 1842 days.

(21) Appl. No.: 11/765,903

(22) Filed: Jun. 20, 2007

Related U.S. Application Data

(63) Continuation-in-part of application No. 11/035,412, filed on Jan. 14, 2005, now Pat. No. 7,580,907.

(60) Provisional application No. 60/536,261, filed on Jan. 14, 2004.

(51) Int. Cl.
*G06F 1/00* (2006.01)
*G06F 5/00* (2006.01)

(52) U.S. Cl.
USPC .............................. 706/20; 382/156; 700/28

(58) Field of Classification Search
USPC ............................................................ 706/14
See application file for complete search history.

(56) References Cited

U.S. PATENT DOCUMENTS

| 4,766,551 A | 8/1988 | Begley |
| 4,803,736 A | 2/1989 | Grossberg et al. |
| 4,818,348 A | 4/1989 | Stetter |
| 4,847,783 A | 7/1989 | Grace et al. |
| 4,958,295 A | 9/1990 | Davidson et al. |
| 5,106,756 A | 4/1992 | Zaromb |
| 5,239,483 A | 8/1993 | Weir |
| 6,594,382 B1 | 7/2003 | Woodall |
| 7,949,621 B2 | 5/2011 | Xiao et al. |
| 2002/0168100 A1* | 11/2002 | Woodall ........................ 382/156 |
| 2003/0012453 A1* | 1/2003 | Kotlikov et al. .............. 382/275 |
| 2004/0071363 A1* | 4/2004 | Kouri et al. ................... 382/276 |

OTHER PUBLICATIONS

Office Action, U.S. Appl. No. 10/292,811, dated Oct. 1, 2007, 9 pages.
United States Patent and Trademark Office Final Office Action dated Oct. 28, 2010 (U.S. Appl. No. 12/558,617, filed Sep. 14, 2009), 7 pages.
United States Patent and Trademark Office Non-Final Office Action dated Sep. 22, 2011 (U.S. Appl. No. 12/542,069, filed Aug. 17, 2009), 10 pages.

* cited by examiner

*Primary Examiner* — Kakali Chaki
*Assistant Examiner* — Kalpana Bharadwaj
(74) *Attorney, Agent, or Firm* — Fich & Richardson P.C.

(57) ABSTRACT

Simulated neural circuitry is trained using sequences of images representing moving objects, such that the simulated neural circuitry recognizes objects by having the presence of lower level object features that occurred in temporal sequence in the images representing moving objects trigger the activation of higher level object representations. Thereafter, an image of an object that includes lower level object features is received, the trained simulated neural circuitry activates a higher level representation of the object in response to the lower level object features from the image, and the object is recognized using the trained simulated neural circuitry.

47 Claims, 10 Drawing Sheets

INVARIANT OBJECT RECOGNITION

CROSS REFERENCE TO RELATED APPLICATION

This application claims priority to U.S. Provisional Application No. 60/536,261, which was filed Jan. 14, 2004, and is titled "INVARIANT OBJECT RECOGNITION," and U.S. application Ser. No. 11/035,412, which was filed Jan. 14, 2005, and is titled "INVARIANT OBJECT RECOGNITION." These applications are incorporated by reference.

TECHNICAL FIELD

This description relates to invariant object recognition.

BACKGROUND

Object recognition is a cornerstone of the function of visual systems, whether neural or manmade. This capacity is indispensable for systems used to review, for example, visual images stored in a computer system or for the function of a sensorimotor system operating in an external world, whether for navigation in complex terrain or rapid identification of the properties of food, friend, or foe.

SUMMARY

In one aspect, simulated neural circuitry is trained using sequences of images representing moving objects, such that the simulated neural circuitry recognizes objects by having the presence of lower level object features that occurred in temporal sequence in the images representing moving objects trigger the activation of higher level object representations. Thereafter, an image of an object that includes lower level object features is received, the trained simulated neural circuitry activates a higher level representation of the object in response to the lower level object features from the image, and the object is recognized using the trained simulated neural circuitry.

Implementations may include one or more of the following features. For example, the images representing moving objects may represent movement of the objects between different starting and ending positions, rotation of the objects, and/or dilation of the objects.

The simulated neural circuitry may include elements having multiple input branches and training the simulated neural circuitry may include initializing connections between elements of the neural circuitry, exposing the simulated neural circuitry to sequences of images representing moving objects, and strengthening consecutively active connections at a common input branch as images of the objects simulate movement of the objects through a visual field of the simulated neural circuitry.

Furthermore, the simulated neural circuitry may be configured such that strengthening of connections jointly strengthens inputs which co-occur within a specified window in time. Additionally or alternatively, activity at one connection to an input branch may cause effects on the input branch that remain active for a period of time spanning the duration of more than a single image in the sequence of images. The simulated neural circuit also may be configured such that connections between different simulated neuronal elements have different temporal properties, with some weakening and some strengthening with repeated input of a given frequency.

The simulated neural circuitry may include simulated neuronal elements having dendritic trees. In some implementations, the simulated neuronal elements may have local non-linear integrative properties. Additionally or alternatively, individual simulated neuronal elements may include multiple input branches, one or more of which may have local nonlinear integrative properties. Simulated neuronal elements also may be configured to homeostatically regulate activity in the simulated neural circuitry.

In some implementations, the simulated neural circuitry may include a simulated neuronal element represented as including multiple branches. In such implementations, a particular branch may be configured to activate when the particular branch receives input that exceeds a first threshold, and the simulated neuronal element may be configured to activate when a number of the simulated neuronal element's branches that are activated exceeds a second threshold.

The simulated neural circuitry may include multiple processing areas, each of which includes multiple neuronal elements. In some implementations, the processing areas may be arranged in a hierarchical series from a lowest processing area to a highest processing area and feed-forward may be provided from outputs of the neuronal elements of one processing area to inputs of neuronal elements of a higher processing area. Additionally or alternatively, higher processing areas may issue feedback to lower processing areas.

In some implementations, the simulated neural circuitry may function as a self-organizing content-addressable memory.

In another aspect, simulated neural circuitry includes at least a first processing area of neuronal elements and a second processing area of neuronal elements. In order to train the simulated neural circuitry to achieve invariant object recognition, connections between simulated neuronal elements of the first processing area and simulated neuronal elements of the second processing area are initialized. A series of different images of an object then are received at the simulated neural circuitry, and, in response, initial encoded representations of the object are generated in the first processing area by activating one or more of the simulated neuronal elements of the first processing area for each received image of the object. The initial encoded representations of the object are transmitted from the first processing area to the second processing area by transmitting signals from active simulated neuronal elements of the first processing area to the simulated neuronal elements of the second processing area to which the active simulated neuronal elements of the first area are connected, and connections to an individual simulated neuronal element of the second processing area are strengthened when the connections to the individual simulated neuronal element of the second processing area are consecutively active.

In some implementations, connections to an individual simulated neuronal element of the second processing area may be strengthened when the connections to the individual simulated neuronal element of the second processing area are active within a specified window of time.

In yet another aspect, an input image of an object is received at simulated neural circuitry that includes a hierarchy of processing areas and that has been trained to recognize one or more objects. In response, an initial encoded representation of the object is generated. The initial encoded representation of the object then is transformed into an invariant output representation of the object by propagating the initial encoded representation of the object through the hierarchy of processing areas such that representations of the object generated in each succeeding processing area are increasingly less variant than the initial encoded representation. The object is recognized based on the invariant output representation of the object.

In still another aspect, a sequence of images of an object is received at simulated neural circuitry. Using the sequence of images, the simulated neural circuitry is trained to generate an encoded representation of the object that includes a higher level feature triggered by recognizing a temporal sequence of lower level features of the object during the training. A corpus of images is searched by supplying each image of the corpus to the simulated neural circuitry, and images from the corpus of images are designated as being images of the object when an output of the simulated neural circuitry produced as a result of an image being supplied to the simulated neural circuitry matches the encoded representation of the object to within a predetermined threshold.

In some implementations, the sequence of images may include a video of the object.

The techniques described may have applications in, for example, automated image and/or video searching and robotics. In addition, implementations of any of the techniques described may include a method or process, an apparatus or system, or a computer program embodied on a tangible computer-readable medium. The details of particular implementations are set forth in the accompanying drawings and the description below. Other features will be apparent from the description, including the drawings, and from the claims.

DETAILED DESCRIPTION

Figure 1:
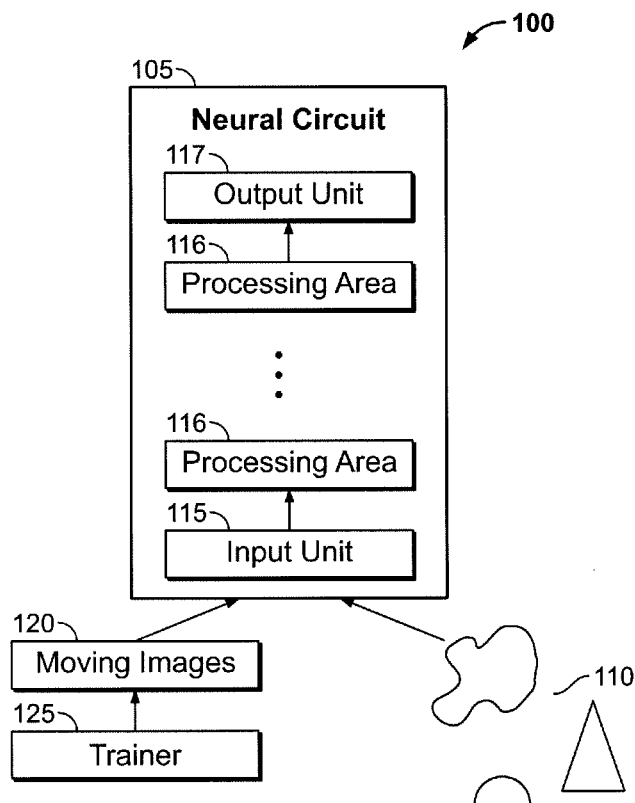
FIG. 1 is a block diagram of an object recognition system.

Natural visual systems take in raw sensory data, which typically shifts as an object or observer moves in the world, resulting in a sequence of images moving across the visual sensory array (the retina). These visual systems must then transform the patterns of input into an invariant representation associated with the identity of the object, enabling a fast decision to be made about appropriate reaction. Thus, in nature, fast neural visual object recognition involves transforming the sequence of patterns representing an object on the retina into a stable pattern that uniquely encodes the object itself. Consequently, such natural systems may be viewed as a self-organizing, content-addressable memory in which the retinal image or low level preprocessor encoding of an image or object quickly triggers the activation of a high level object representation.

The mammalian cortex includes primary areas which receive direct retinal input (after it has been preprocessed in a relay station known as the "thalamus"). As a result, the pattern on the visual sensor surface that is activated in response to perception of an apple may be entirely different depending upon whether the apple is close to or far from the viewer. Nevertheless, the pattern of activity triggered in the higher association areas ultimately is relatively invariant to the scale and/or position of the object.

Conversely, though an apple and a rock of similar size and shape may trigger highly overlapping initial images on visual sensors (e.g., the retina), these two objects nevertheless may trigger different patterns in higher cortical areas. This illustrates the power of these natural object recognition systems in which overlapping representations of different objects of similar size, location and shape in lower areas trigger activation of different representations in higher areas, while entirely non-overlapping and dissimilar representations of the same object in different positions or orientations in lower areas trigger the same invariant pattern in higher areas of the system.

Select aspects of these natural visual systems may be used to implement powerful visual object recognition systems. Such systems may be employed to perform visual object recognition for the purpose of, for example, reviewing visual images stored in a computer system, reading artificial images in a virtual world (e.g., Second Life), performing visual searches, or recognizing what is in an image. Particular implementations of these systems may be used in searching a corpus of still or video images to find an object that matches an object for which a still or moving image has been provided. Other applications may include enabling a missile tracking system to discriminate a target from noise and other interfering images, or assisting a robotic vehicle that is exploring a hostile or distant environment and needs to navigate in close quarters in a terrain filled with objects to identify and characterize the properties of both targets and obstacles. In addition, an autonomous commercial vehicle navigation system may use the system to distinguish the identity of moving objects, while an artificial visual system aiding the blind may use the system to identify nearby objects. Other applications include face recognition and character recognition for handwritten characters, in all languages.

Many conventional computer vision algorithms for object recognition use a computationally-intensive, three-part strategy: first, the presence of an object is identified, with some form of figure-ground segregation methods; second, the object is transformed into a centered and normalized reference frame (object-centered coordinates) so that it may be compared with stored exemplars; and third, the centered and normalized object is then matched to a template or a set of related templates, or compared with object templates using basis-function or principal component methods. In these systems, the figure-ground and normalization procedures may require significant computation and/or processing power. In addition, iterative comparison of the normalized object of interest with all of the stored objects also may require significant computation and/or processing power. Consequently, these systems may not be suitable for real-time applications.

Simulated neural circuitry for object recognition, however, may not require a figure-ground operation to identify an object. Furthermore, such circuitry does not require geometric transformation in order to reach a normalized and centered coordinate system. Accordingly, such simulated neural circuits may be suitable for real-time applications.

Two particular aspects of neural circuitry may be used to confer great power to these simulated neural circuits. First, synaptic connections mediating inputs which arrive at a branch within a window in time are mutually strengthened. Neuronal dendritic branches may "fire" if a threshold amount of input arrives within a window in time. Once activated, synaptic connections remain primed to strengthen upon branch firing within a window in time. Taken together, these properties provide that a connection between an axon and a dendritic branch that was active a short while ago remains ready to strengthen upon firing of the dendritic branch, even if the dendritic branch fires in response to activity in a different axon at the synapse. In this way, separate features active during temporally adjacent views of an object within a time window become wired to the same neuronal element (or to the same dendritic branch of the neuronal element). Thus, the time window allows features encoding successive view of objects in a lower area to be jointly wired to the same cell in a higher area.

Secondly, dendritic branches may act as quasi-isolated non-linear elements. In more traditional neural networks, neuronal elements sum input in a simple manner, with linear summation of inputs passed through a thresholding function in a classic neural network unit. By contrast, neuronal elements may be represented as branched "dendritic" trees with electrically active nonlinear branches receiving input. Neuronal input to a branch over a period of time is integrated and can "fire" that branch, that is trigger a locally generated excitatory event, so that each branch acts as a quasi-isolated nonlinear element. The reconception of neurons as branched structures with nonlinear active processes in each branch greatly enhances the power of neuronal elements as computational units.

Referring to FIG. 1, an object recognition system 100 employs a neural circuit 105 that includes an input unit 115, a hierarchy of processing areas 116, and an output unit 117 to recognize objects 110. Initially, the neural circuit 105 is trained to recognize different objects by exposing the input unit 115 of the neural circuit to sequences of time varying images 120 of the different objects. In some implementations, the sequences of time varying training images 120 of the objects may be provided to the neural circuit 105 by a trainer 125.

In response to receiving a sequence of time varying images of a particular object 120, patterns of activity signifying encoded representations of the particular object in the sequence of time varying images 120 are generated in the input unit 115 and transmitted to the hierarchy of processing areas 116. As described in more detail below, during the training process, components of the hierarchy of processing areas 116 are wired (i.e., connections are formed, strengthened, weakened, and/or severed) such that, as encoded representations of the particular object within the sequence of time varying images 120 propagate through the hierarchy of processing areas 116, increasingly invariant patterns of activity are generated in each successive processing area. In this manner, the neural circuit 105 is trained such that exposure to an image of the particular object results in the same (or a substantially similar) pattern of activity in the highest processing area of the hierarchy of processing areas 116 and the output unit 117 regardless of, for example, the object's size, shape, orientation or location within the image.

Once the neural circuit 105 is trained, the neural circuit 105 may be used to detect and/or identify objects 110 presented to the input unit 115 of the system from, for example, image files or a live input device such as a camera. For example, as noted above, the system may be used in searching a corpus of still or video images to find an object that matches an object for which a still or moving image has been provided.

In some implementations, training of the neural circuit 105 may be a discrete process that occurs prior to using the neural circuit to identify objects. In other implementations, the neural circuit 105 may continue to be trained even as it is used to identify objects.

Aspects of the neural circuit 105 are based upon the circuit elements, wiring architecture, and connection (synaptic) properties of the mammalian cortical hierarchy, a neural structure which accomplishes tasks such as object recognition in real-world environments rapidly, and which encodes representations of visual objects which are invariant with respect to changes in object size, orientation, and position in the visual field. The mammalian cortical hierarchy functions as a content-addressable memory, in that simply inputting a visual image of an object causes a cascade of feed-forward and feedback signals which result in increasingly invariant representations of the object within each succeeding cortical area.

The neural circuit 105 is structured similarly to the mammalian cortical hierarchy in that it has a number of simulated neuronal elements that are arranged in a hierarchy of areas 116. In response to receiving an input image of an object, a pattern of activity is generated in the first area of the neural circuit 105. This pattern of activity in the first area is then transformed in the second area, and retransformed in the third area, and so on, such that the pattern of activity that ultimately reaches the highest area of the neural circuit 105 results in an invariant representation of the object.

The neural circuit 105 includes neuronal elements that have the local, nonlinear integrative properties of neurons and may be implemented in hardware or software. For example, the neural circuit 105 may be implemented as a software module or as a module of synthetic neural circuitry rendered in very large scale integrated circuitry (VLSI) or a field-programmable gate array (FPGA) that is configured to receive visual (or other sensory) raw data that has been processed through a topographically organized feature detector. During a period of unsupervised learning that involves the presentation of common objects moving through the environment, the neural circuit 105 is configured to adjust the connection strengths between neuronal units so that, upon later presentation of a familiar object, a distributed pattern representing an invariant encoding of the object is activated in a high-order area of the neural circuit 105.

In some implementations of the neural circuit 105, the primary flow of information is feed-forward. However, implementations of the neural circuit 105 also may include feedback and intra-area input. As with mammalian sensory cortices, the feed-forward connections in a cascade of several processing areas within the neural circuit 105 may be self-organized during the course of early experience. That is to say, the wiring of the neural circuit 105 may be established by exposure to the environment (e.g., sequences of images of objects), rather than by some supervised method.

Before providing a more detailed explanation of how the neural circuit 105 is organized and trained, an overview of the basic concepts of neural circuit operation is provided with respect to FIGS. 2A-2C, 3A, 3B and 4-6.

Figure 2A:
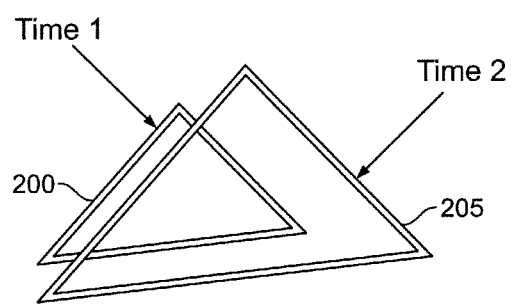
FIGS. 2A-2C, 3A, 3B and 4-6 are block diagrams that visually represent invariant object recognition mechanisms.
Figure 2B:
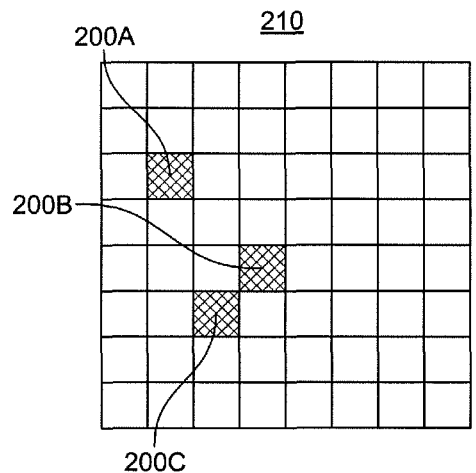
Figure 2C:
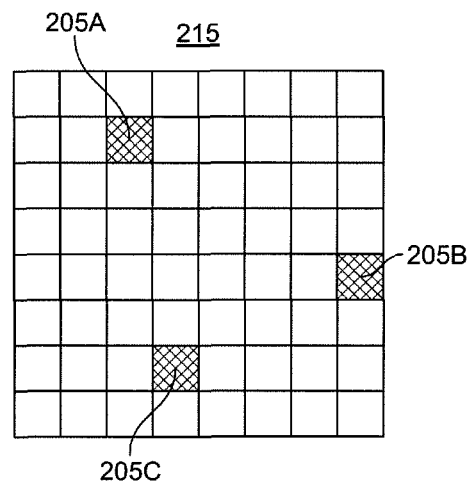

FIGS. 2A-2C illustrate the encoding of a visual image in the primary, or initial, visual area. In particular, FIGS. 2A-2C present a simplified example of how an object (in this case a triangle) may be encoded in a primary processing area (analogous to an area of the cerebral cortex, e.g., V1).

FIG. 2A shows a first image 200 of a triangle at a first time ("Time 1") and a second image 205 of the triangle at a second time ("Time 2"). At the second time, the triangle is closer to the viewer than at the first time and hence has dilated (expanded) on the retina or camera. The first image 200 includes edges 202A, 202B and 202C, and the second image 205 includes edges 207A, 207B and 207C. While FIG. 2A shows both images 200 and 205, it should be understood that the two images are separately displayed at different moments in time.

FIG. 2B illustrates an encoded representation of the first image 200 in a processing area. In particular, for illustrative purposes, the processing area is represented by an 8-by-8 grid 210 of simulated neural cells and the complex shape of the first image 200 is encoded as a set of active simulated cells in grid 210. As illustrated in FIG. 2B, simulated cells 200A, 200B, and 200C are activated in response to exposure to the first image 200. Each active simulated cell represents a different edge of the image 200, where each edge has a different location and orientation. More particularly, cell 200A represents edge 202A, cell 200B represents edge 202B and cell 200C represents edge 202C.

FIG. 2C illustrates an encoded representation of the second image 205 in the same processing area. As shown in FIG. 2C, the second image 205 is similarly represented by simulated neural cells 205A, 205B and 205C in a second grid 215, where the cells 205A, 205B and 205C represent, respectively, the edges 207A, 207B and 207C. There is no overlap between the encoding of the first image 200 of the triangle at Time 1 and the encoding of the second image 205 of the triangle at Time 2, even though both images represent the same object. This is because the second image 205 of the triangle at Time 2 exhibits a different location and size from the first image 200 of the triangle at Time 1 and, therefore, generates activity in different simulated cells. Indeed, had image 205 been larger, one or more of its edges could have activated multiple cells such that its representation and that of image 200 would have included different numbers of active cells.

Figure 3A:
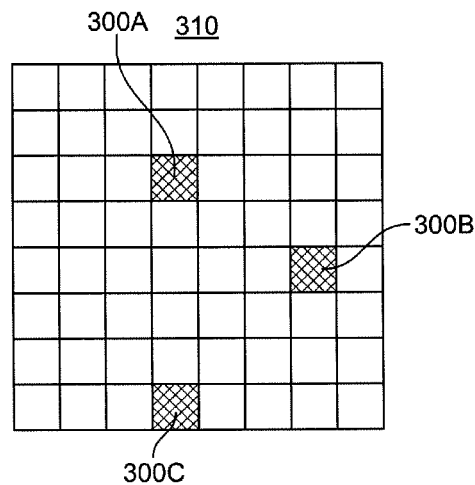
Figure 3B:
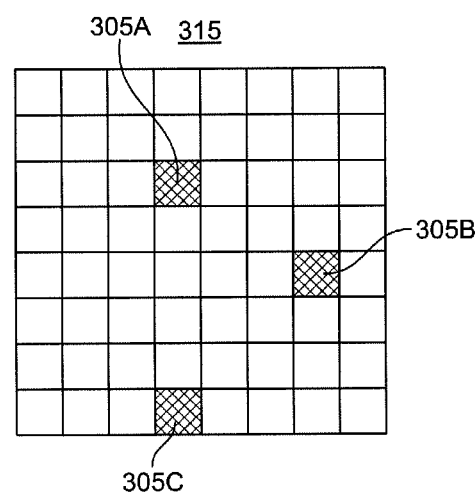

FIGS. 3A and 3B illustrate the desired invariantly encoded representations of the images 200 and 205 in a higher processing area. More particularly, FIG. 3A illustrates an encoded representation of the first image 200 of the triangle in the higher processing area and FIG. 3B illustrates an encoded representation of the second image 205 of the triangle in the higher processing area. As explained in greater detail below, the representations of the images 200 and 205 in the primary processing area are transmitted by simulated neural circuitry to the higher processing area where they are transformed into different representations of the images 200 and 205. As illustrated in FIGS. 3A and 3B, the higher processing area is represented as another 8-by-8 grid of simulated neural cells, with the first image 200 of the triangle at Time 1 being represented by active simulated cells 300A, 300B and 300C in a grid 310, and the second image 205 of the triangle at Time 2 being represented by the same active simulated cells 305A, 305B and 305C in a grid 315. FIGS. 3A and 3B are illustrative of how the representation of an object in higher processing areas of the neural circuit becomes less dependent upon the object's position and scale, and more associated with the identity of the object itself. That is to say, in the higher processing area, the encoding stays invariant as an object approaches, or otherwise changes size and/or orientation. This results in a useable representation of the identity and presence of an object.

Figure 4:
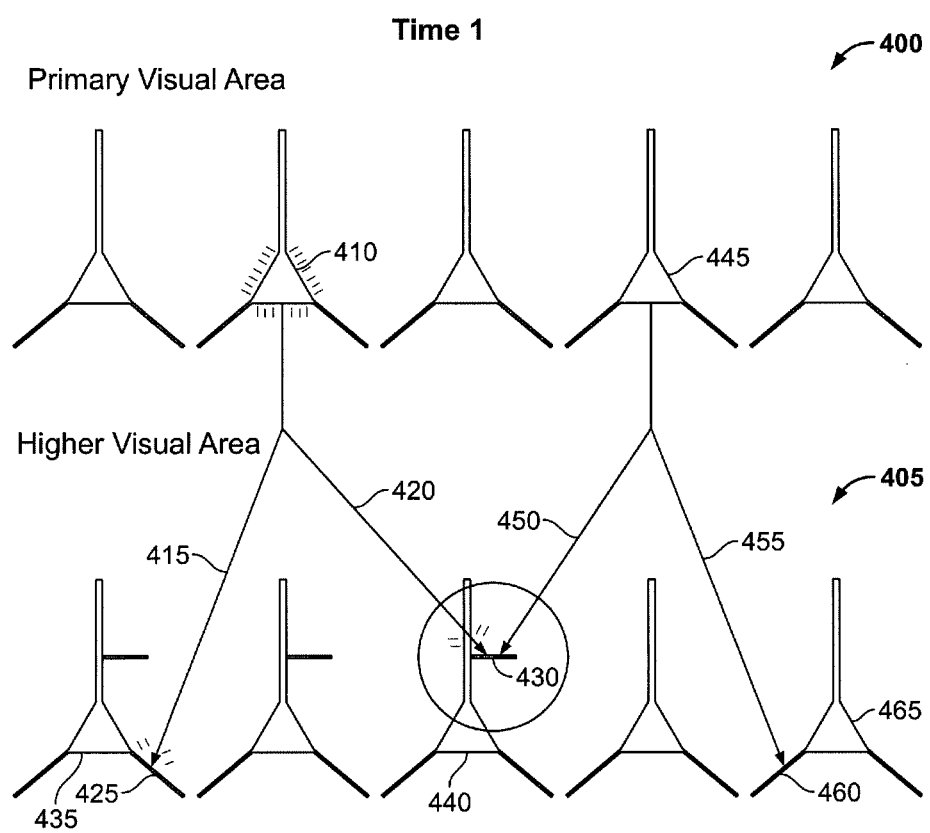
Figure 5:
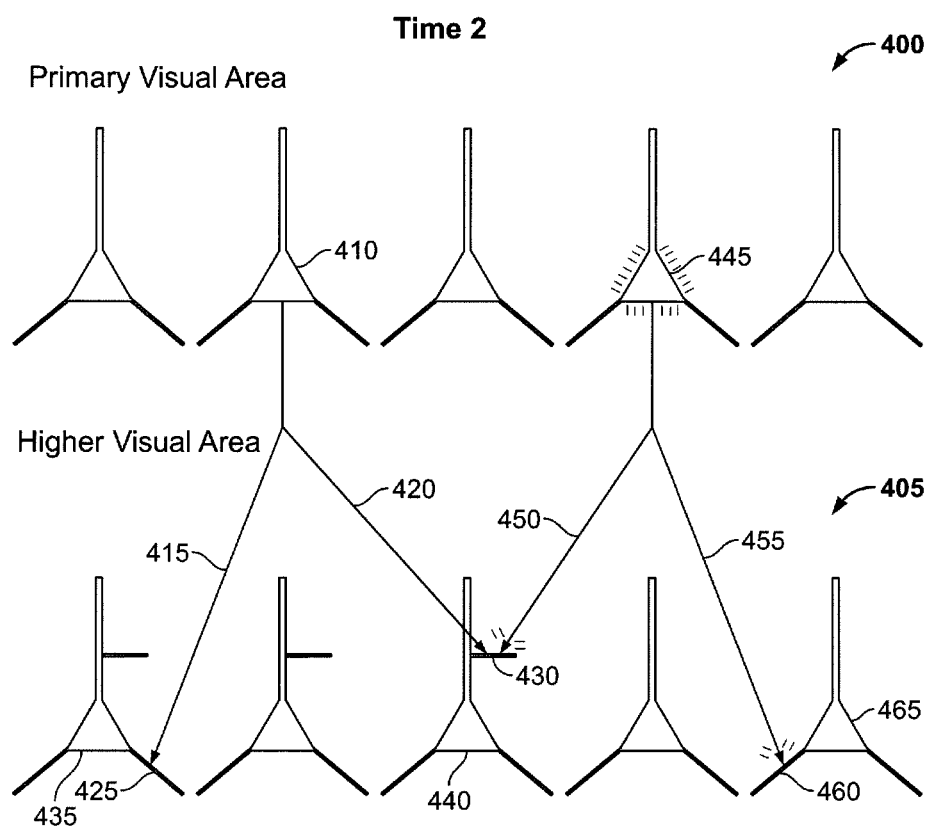
Figures 6, 7:
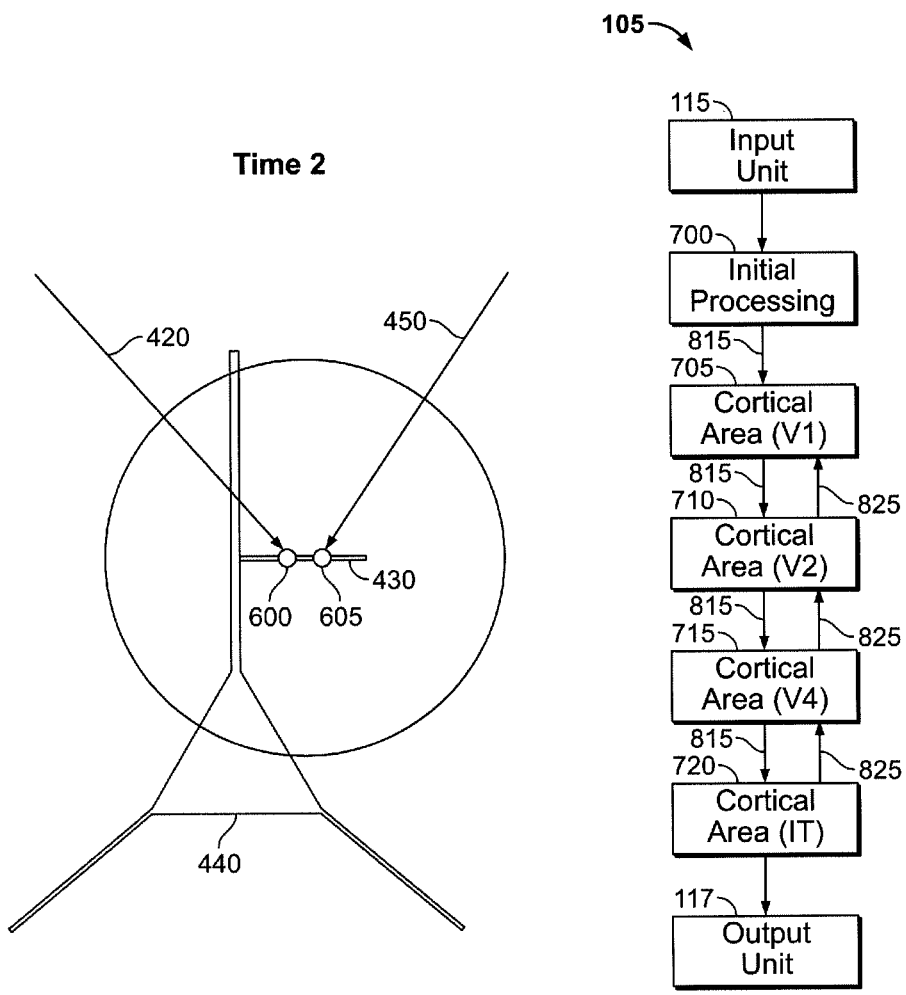
FIG. 7 is a block diagram of a neural circuit of the system of FIG. 1.

FIGS. 4-6 illustrate how the wiring at the single neuronal unit level to enable the invariant representation of the first and second images 200 and 205 illustrated in FIGS. 3A and 3B arises given the inputs illustrated in FIG. 2A and the dissimilar representations of the first and second images 200 and 205 illustrated in FIGS. 2B and 2C.

FIG. 4 shows a single row 400 of simulated cells from the primary processing area and a single row 405 of simulated cells from a higher processing area at Time 1. As shown, a single simulated cell 410 (e.g., a cell representing the point 200A of FIG. 2B) in the row 400 representing the primary processing area is active. The simulated cell 410 includes outputs 415 and 420 ("axons" in the context of biological neurons) that are connected to provide input to branches 425 and 430 ("dendrites" in the context of biological neurons) of simulated cells 435 and 440 (e.g., a cell representing the point 300A of FIG. 3A) of the row 405 that represents the higher visual area. Because the simulated cell 410 is active, a signal is provided through the outputs 415 and 420 to the branches 425 and 430. It should be understood that FIG. 4 is exemplary, and that a simulated cell actually may have hundreds of branches, each of which may have on the order of 100 connections to other simulated cells such that a simulated cell may have well over 10,000 inputs. Additionally or alternatively, the branches of a simulated cell may include numerous sub-branches such that the branches of the individual simulated cell exhibit their own hierarchical structure and function.

As also shown in FIG. 4, a different simulated cell 445 (e.g., a simulated cell representing the point 205A of FIG. 2C) of the row 400 representing the primary processing area has an output 450 connected to the branch 430, and an output 455 connected to a branch 460 of a simulated cell 465. Since the simulated cell 445 is not active, a signal is not provided through the outputs 450 and 455.

FIG. 5 illustrates the rows 400 and 405 of simulated cells at Time 2. As illustrated in FIG. 5, the result of the movement of the image of the triangle from the first image 200 at Time 1 to the second image 205 at Time 2 is that the simulated cell 410 is no longer active at Time 2 and the simulated cell 445 is active at Time 2. Since the simulated cell 445 is active, a signal is provided through the outputs 450 and 455. Because the outputs 420 and 450 are sequentially active, branch 430 remains active for an extended time period. The system is configured such that all connections to a branch that have been active when outputs connected to the branch have been sequentially active are strengthened, and, as a result, the synaptic connections of the outputs 420 and 455 to the branch 430 are strengthened. That is to say, the input resulting from the output 420 being active at Time 1 remains ready to strengthen its connection to the branch 430 at Time 2. For purposes of determining whether to strengthen the connections between the outputs and the branch, the activation of an output, in effect, remains active for a period of time spanning the duration of more than a single image in a sequence of images.

FIG. 6 illustrates a blowup of the branch 430 of the simulated cell 440 that receives input from the output 420 at Time 1 and from the output 450 at Time 2. The black circles 600 and 605 indicate newly strengthened synaptic connections between the outputs and the branch. As a result of the strengthening of these connections, when either of simulated cells 410 and 445 in the primary processing area is activated, the simulated cell 440 in the higher area also will be activated. As such, a shifting sequence of patterns of input in the primary processing area becomes associated with a constant (i.e., invariant) pattern of activity in the higher area, thereby resulting in the desired invariant encoding of the object. This process is iterated from area to area to area and results in the self-organization of wiring which provides for the desired invariant encoding in successively higher areas. Furthermore, this process of self-organized wiring may be said to result in content-addressable memory in that the same content (e.g., object) results in the generation of the same pattern of activity in the higher processing areas, irrespective of the location, shape, size, or orientation of the object.

FIG. 7 illustrates an implementation of the neural circuit 105 of FIG. 1. As discussed above, the neural circuit 105 may be implemented in software, which may run, for example, on a parallel processing hardware platform, or in hardware, such as in VLSI or an FPGA.

The neural circuit 105 includes the input unit 115, which, as discussed above, obtains an input in the form of an image (e.g., when the input unit is a camera) or a digital file representative of an image.

An initial processing module 700 receives an output from the input unit 115 and converts that output into a form useable by subsequent modules of the neural circuit 105. For example, the initial processing module 700 may convert one frame of a moving image into a set of any order (e.g., 8×8 or 1000×1000) output signals that represent different aspects of each pixel of the image or aspects of larger regions of the image or of the entire image. The properties conveyed by each pixel may simply be brightness of a given hue at that point, as in a camera, or the output of a filter such as a "center-surround" filter which responds strongly to a spot of white on a black background, but not to a uniform field of white.

The output from the initial processing module 700 is supplied to a first neural module 705 that supplies its output to a second neural module 710 and that receives feedback from the second neural module 710. The second neural module 710 supplies its output to, and receives feedback from, a third neural module 715, that supplies its output to, and receives feedback from, a fourth neural module 720. The fourth neural module 720 produces an output that is supplied to an output unit 725. As an input signal representing (or including) a visual object propagates from the input unit 115 through the initial processing module 700, the first neural module 705, the second neural module 710, the third neural module 715, and the fourth neural module 720, the signal is transformed by each module along the way such that the pattern of activity in the output unit 725 represents (or includes) an invariant representation of the visual object.

Each of the neural modules 705, 710, 715, and 720 includes an array of simulated neuronal cells, such as, for example, a 16-by-16 array. Though not shown in FIG. 7, in addition to receiving feed-forward input from a preceding module and feedback input from a subsequent module, a neuronal cell of a neural module also may receive input from other neuronal cells of the same module.

Figure 8:
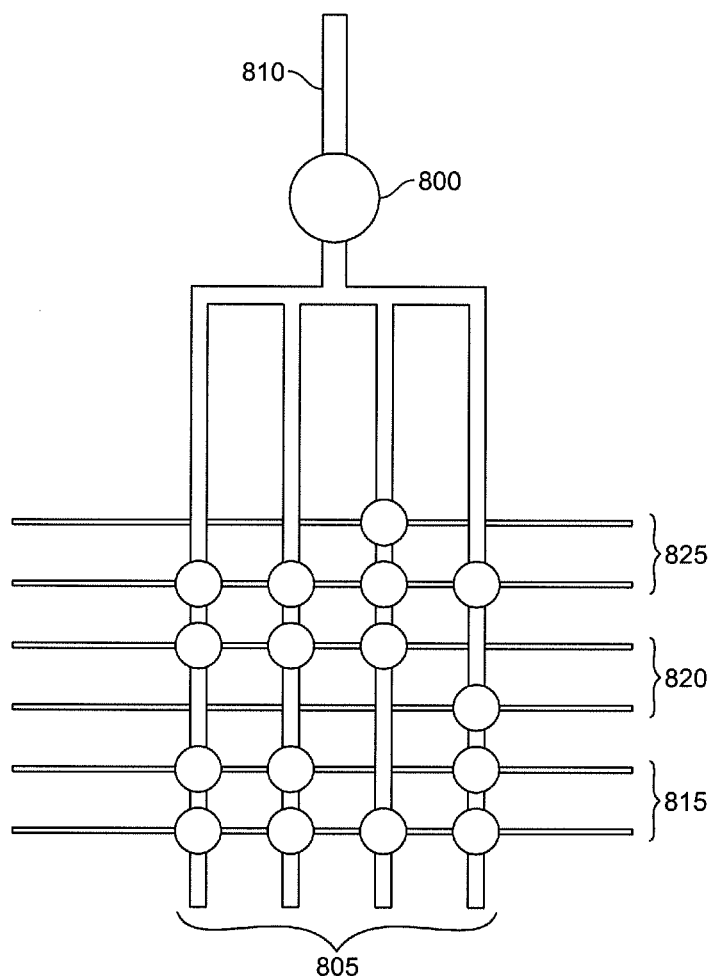
FIG. 8 is a block diagram of a cell of the neural circuit of FIG. 7.

As shown in FIG. 8, each simulated neuronal cell 800 includes a hierarchy of input branches 805, each of which is connected to multiple inputs, and an output 810. For example, in a particular implementation, a simulated cell may include 100 input branches, each of which is connected to receive 100 inputs. A threshold amount of input (at a particular instant or during a window of time) from a set of co-active inputs causes an individual branch to fire, and, in turn, the firing of a threshold number of the input branches 805 (at a particular instant or during a window of time) causes the neuron 800 to fire. In some implementations, the threshold amount of activity required to fire individual branches and/or neurons may be dynamically (e.g., automatically) adjusted to achieve a desired (e.g., homeostatic) level of activity and/or performance in the neural circuit. Such dynamic adjusting of the threshold levels required to trigger branches to activate and neurons to fire may be referred to as homeostatic thresholding.

The inputs supplied to the input branches 805 may include a number of input types, including feed-forward inputs 815, intra-array inputs 820, and feedback inputs 825. Feed-forward inputs 815 are the outputs from the initial processing module 700, in the case of a simulated cell from the first neural module 705, or the outputs from the simulated neuronal cells of a preceding neural module, in the case of the neural modules 710, 715, and 720.

Intra-array inputs 820 are the outputs from simulated neuronal cells within the same array. Intra-array inputs 820 also are generally distributed topographically such that intra-array inputs to a simulated neuronal cell often may be provided by neighboring simulated neuronal cells.

Feedback inputs 825 are the outputs of the simulated neuronal cells of a succeeding neural module. Feedback inputs 825 tend to be much less topographical than feed-forward inputs 815 or intra-array inputs 820, such that the feedback inputs 825 into an array are much more widely distributed. As illustrated in FIG. 7, the simulated neuronal cells of the fourth neural module 720 do not receive feedback inputs 825.

Each array also may include simulated inhibitory cells, referred to as simulated interneuronal cells, that tend to quench activity. Each of these simulated interneuronal cells receives inputs from simulated neuronal cells and from other simulated interneuronal cells. The interneuronal cells may be used to provide local lateral inhibition to sharpen representations at each succeeding neural module.

In general, the outputs of the simulated interneuronal cells tend to be used as intra-array inputs 820, rather than as feed-forward inputs 815 or feedback inputs 825. In another implementation, each cell of the array includes a simulated neuronal element and a simulated interneuronal element.

The system may be initialized with small random connection weights between inputs and input branches. Then, the system may be trained by exposing the system to a library of sequences of images of visual objects. As each object moves through the visual field in the manner described above, synapses will change strength through a process in which active connections are strengthened and inactive connections tend to weaken. The objects are presented and represented in many different starting and ending positions, so that the system is exposed to objects in many different random trajectories. During this training phase, synapse modifications may be ongoing, and it is in this sense and during this time that the wiring of the neural circuitry self organizes. Although not illustrated as such in FIG. 8, the input branches 805 of the neuron 800 may include numerous sub-branches connected to various inputs such that the branches 805 fire in response to a threshold level of activity (at a particular instant or during a window of time). In this manner, individual neurons may exhibit a hierarchical structure and function.

Figure 9:
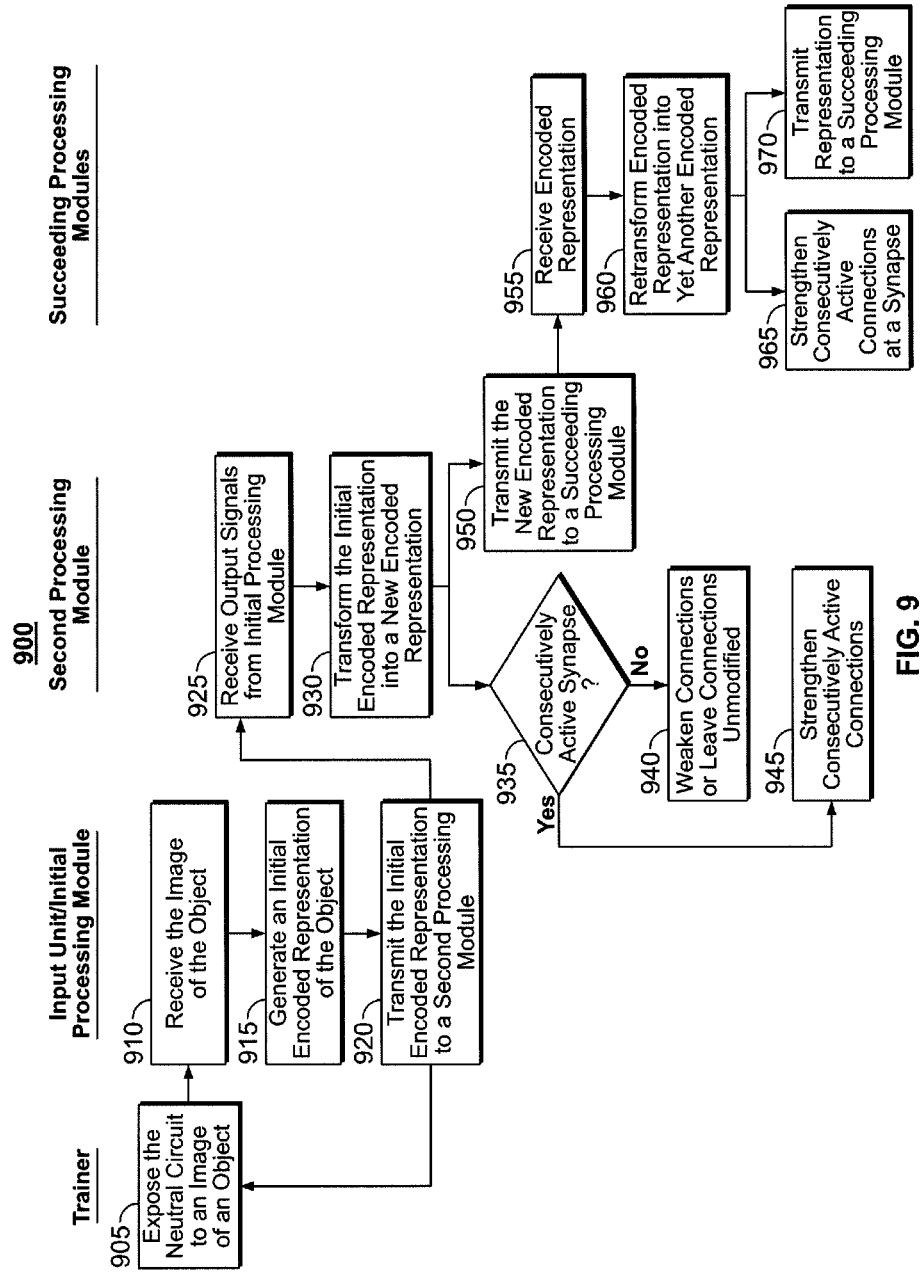
FIG. 9 is a diagram of an example of a process for training a neural circuit to achieve invariant object recognition.

FIG. 9 is a diagram of an example of a process 900 for training (e.g., wiring) a neural circuit, such as, for example, the neural circuit 105 of FIGS. 1 and 7, to achieve invariant object recognition. That is to say, FIG. 9 is a diagram of an example of a process 900 for training a neural circuit to recognize an object (or an image, or an object within an image) irrespective of the object's location, size, scale, and/or orientation. The neural circuit includes an initial processing area for generating an initial encoded representation of an input image and one or more additional simulated neural modules for transforming an initial encoded representation of an input image into a representation of the image that is invariant with respect to the input image's location, size, scale, and/or orientation. Before the process 900 begins, connections already may exist between simulated neuronal cells of the initial processing area and simulated neuronal cells of the one or more succeeding simulated neural modules. However, as discussed above in connection with FIGS. 4-6, new connections may be formed and the initial connections may be strengthened, weakened, and/or severed during the training process to achieve invariant object recognition.

The process 900 is an iterative process that involves repeatedly exposing the neural circuit to different images of the same object having various different locations, orientations, and sizes. The process 900 begins by exposing the neural circuit to an image of an object (905). The neural circuit receives the image of the object (910) at, for example, an input unit such as input unit 115 of FIGS. 1 and 7. Thereafter, an initial encoded representation of the object is generated by activating one or more simulated cells in an initial processing module of the neural circuit (915). The initial encoded representation of the object is then transmitted to a second processing module, such as, for example, the first neural module 705 of FIG. 7, by generating output signals on the connections between the activated simulated cells of the initial processing module and simulated cells of the second processing module (920). At approximately the same time, another image, in which the object exhibits a different location, orientation, and/or size, is exposed to the neural circuit, and a second iteration of the process 900 begins.

Meanwhile, the output signals from the activated simulated cells of the initial processing module are received by the simulated cells of the second processing module that are connected to the activated simulated cells of the initial processing module (925) and the initial encoded representation of the object is transformed into a new encoded representation of the object by activating one or more of the simulated cells of the second processing module based on the received output signals (930).

In addition, for each simulated synapse that received an output signal from the initial processing module, a determination is made as to whether the simulated synapse was active during the previous iteration of the process 900 (or whether the simulated synapse was active within a given window of time) (935). If the simulated synapse was not active during the previous iteration (or within the given window of time), the connections at the synapse may be left unmodified or they may be weakened (940). In contrast, if the simulated synapse was active during the previous iteration (or within the given window of time), both the previously active connection and the currently active connection at the synapse are strengthened (945). As discussed above in connection with FIGS. 4-6, this practice of strengthening connections at a synapse based on consecutive activity may result in the transformation of divergent patterns of input in the primary processing module generated in response to different images of the same object into less variant representations of the object in the second processing module.

After the new encoded representation of the object is generated, the representation is transmitted to a succeeding processing area, such as, for example, the second neural module 710 of FIG. 7 (950), where it is received (955) and transformed into yet another encoded representation (960), and where consecutively active connections (or connections that are active within a given window of time) at a synapse also are strengthened (965). The retransformed encoded representation of the object then is transmitted to another succeeding processing module (970). Thereafter, the process of transforming and retransforming encoded representations of the object over multiple processing modules and modifying the connections between simulated cells of adjacent processing modules is continued for each of the remaining processing modules of the simulated neural circuit.

As the number of different images of the object to which the neural circuit is exposed increases and the connections between simulated cells of adjacent processing modules are modified, the encoded representations of the object may become increasingly invariant at each subsequent processing area. Eventually, the encoded representation of the object generated in the highest processing area may become relatively invariant irrespective of the location, size, scale and/or orientation of the object in the input image. At this point, the process 900 may be stopped and repeated for one or more additional objects. (In an alternative approach, the system is trained using intermingled sequences of images of different objects). As the neural circuit is trained to recognize additional objects, the invariant representations of each object may be recorded in a catalog or library of invariant representations such that a later output representation generated by the neural circuit may be identified by comparing the later output representation with the representations recorded in the catalog or library. However, the use of such a catalog or library is not required; other implementations may make use of the system by comparing the representations of target images to the representation of a known image to determine whether the target images include the same object as the known image.

In some implementations, additional or alternative mechanisms for modifying synaptic connections may be employed. For example, if an input is active but does not result in the firing of a branch to which it is connected, the connection between the input and the branch may be weakened. In contrast, if an input is active and it results in the firing of the branch to which it is connected, the connection between the input and the branch may be strengthened. As another alternative, if a branch of a neuron is active and results in the firing of the neuron, the significance or weight assigned to the branch for purposes of firing the neuron may be strengthened.

Figure 10:
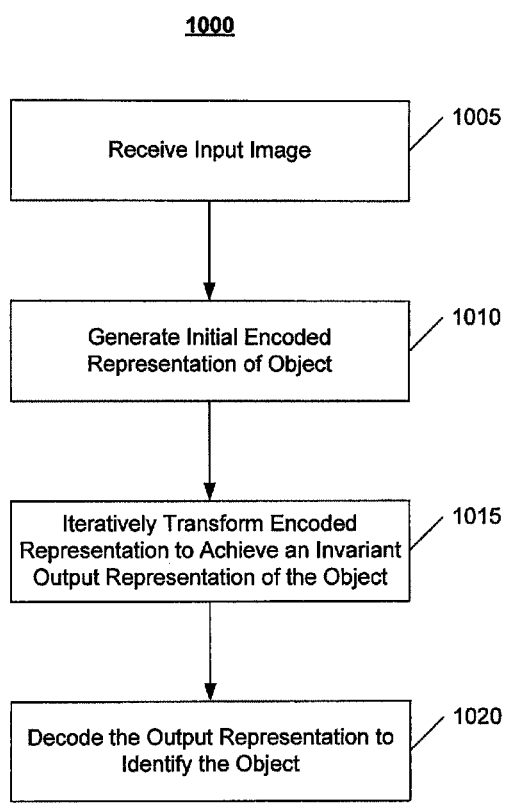
FIG. 10 is a flow chart of a process for recognizing an object in an input image.

After a neural circuit has been trained to recognize one or more objects (e.g., according to the process 900 of FIG. 9), the neural circuit may be used to recognize one or more objects in an image irrespective of the location, size, scale, and/or orientation of the object in the image. FIG. 10 is a flow chart of a process 1000 for recognizing an object in an input image. The process 1000 may be performed by a neural circuit having a hierarchy of processing areas that each include one or more simulated neural cells that have been connected to one or more simulated neural cells in a succeeding processing area of the hierarchy as a result of a training process. For example, the process 1000 may be performed by the neural circuit 105 of FIGS. 1 and 7 after the neural circuit 105 has been trained.

The process 1000 begins when the neural circuit receives an input image that includes an object (1005). In response to receiving the input image including the object, an initial encoded representation of the object is generated by activating one or more simulated neural cells in an initial processing area (1010). The initial encoded representation of the input image is then iteratively transformed in each processing area of the hierarchy of processing areas by propagating the encoded representation of the image along the connections between the processing areas established during training (1015) Ultimately, a relatively invariant output representation of the image is generated in the highest processing area. The object included in the image is then identified by decoding the output representation of the image generated in the highest processing (1020). In some implementations, the relatively invariant output representation of the image is decoded by comparing the output representation generated in the highest processing area with known output representations of objects, and determining the identity of the object based on the known output representation that is most similar to the output representation generated in the highest processing area.

As discussed above, an object recognition system, such as, for example, the object recognition system 100 of FIG. 1, may have numerous applications. In one example, the object recognition system 100 may enable image and/or video searching such that a user can search for and locate one or more images and/or videos that include a desired object. Additionally or alternatively, the object recognition system 100 may enable a user to search for and locate one or more images and/or videos that are similar to an image and/or video provided by the user. For instance, the object recognition system 100 may be implemented in software on a computer, such as, for example a personal computer (PC) or a Mac, that is connected to the Internet, or another similar content repository, and the object recognition system 100 may enable a user to locate desired images and/or videos available on the Internet.

The following example is illustrative of such an example. A user of the object recognition system 100 may be an aeronautics enthusiast and may desire to locate images and/or videos that include an airplane, as opposed to other forms of aeronautic transportation (e.g., helicopters, space shuttles, and rockets). In order to locate such images and/or videos, the user may provide one or more images and/or videos of an airplane to the object recognition system 100 and request that the object recognition system 100 search for and locate one or more additional images and/or videos of an airplane on the Internet. In response, the object recognition system 100 may supply the images and/or videos of the airplane to the neural circuit 105 to train the neural circuit to identify airplanes by generating an invariant pattern of activity in the neural circuit known to correspond to exposure to an airplane. In some implementations, this training may involve, for example, having the system 100 generate moving, scaled and reoriented versions of the airplane in order to train the neural circuit 105. In other implementations, the neural circuit 105 may have been previously trained using moving, scaled and reoriented images of an airplane from a corpus of images or using available video content. In such implementations, the user may be able to enter a textual search query (e.g., "airplane") as opposed to providing one or more images and/or videos of an airplane as the search query.

Next, a corpus of additional images and/or videos (e.g., a corpus of images and/or videos available on the Internet) may be accessed and individual images or videos may be input to the neural circuit 105. If an input image or video includes an airplane, it will trigger a pattern of activity in the neural circuit that is the same as, or substantially similar to, the pattern of activity known to correspond to an airplane and thus can be identified to the user as an image or video that includes an airplane. When a video including an airplane is identified, the object recognition system 100 also may be able to identify the time(s) and/frame(s) at which the airplane appears in the video. Because the object recognition system 100 is able to identify an object based on the pattern of activity generated by the object, the object recognition system 100 may be able to identify an object more quickly than another object recognition system that employs an algorithmic approach that requires template matching.

Figure 11:
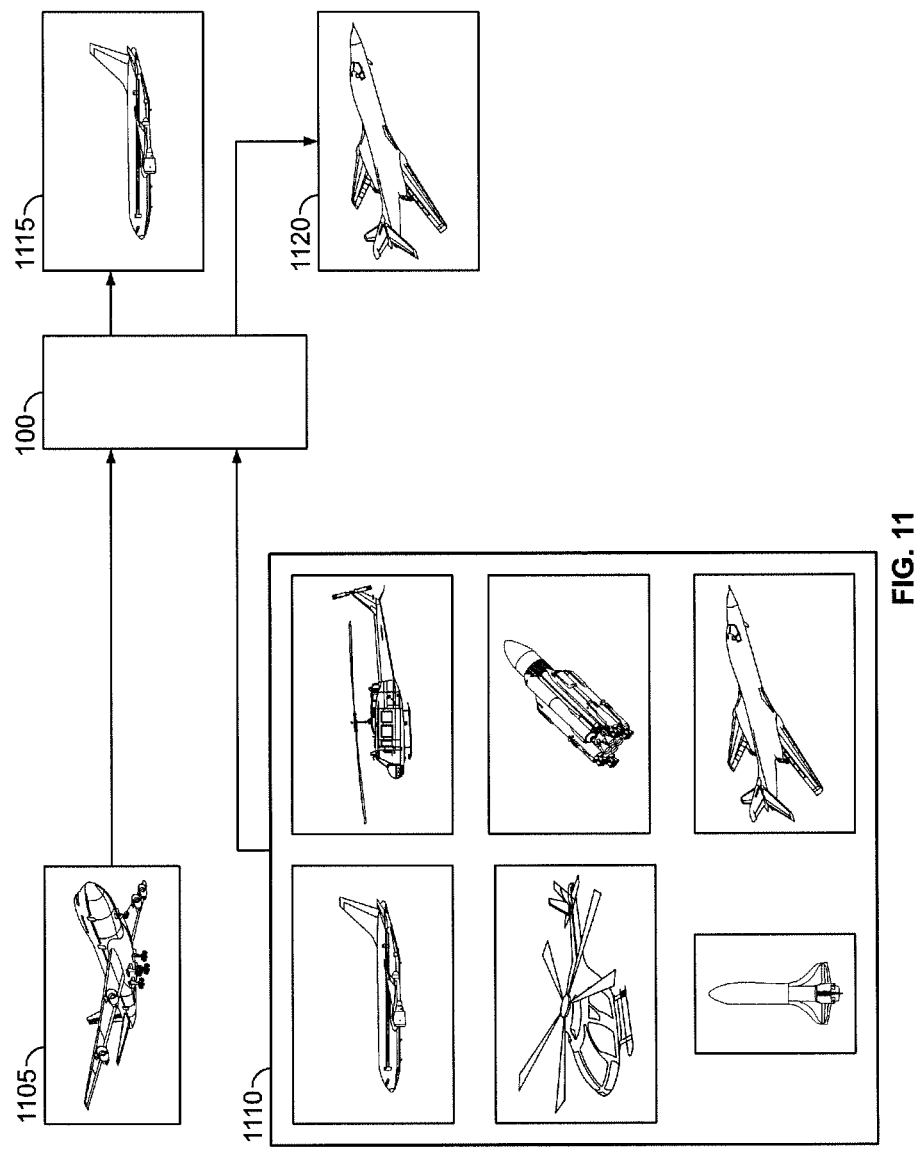
FIG. 11 is a block diagram, of an object recognition system.

FIG. 11 is a block diagram of the object recognition system 100 of FIG. 1 that illustrates how the object recognition system 100 can be used to search for and locate one or more images and/or videos that include a desired object. As illustrated in FIG. 11, a user interested in locating images and/or videos that include an airplane may provide a video or an input image set 1105 that includes an airplane to the object recognition system 100.

The input video or image set 1105 is then processed by the neural circuit to train the neural circuit to recognize the airplane in the input video or image set 1105 and an invariant encoded representation of the airplane in the input video or image set 1105 is generated. The object recognition system 100 then accesses a number of images from the Internet 1110, or another similar content repository, and processes each of the accessed images with the neural circuit. Videos or images that generate encoded representations in the neural circuit that are within a threshold level of similarity to the encoded representation generated in response to the input video or image set 1105 are then determined to be videos or images that include an airplane and are returned to the user as output videos or images 1115 and 1120. As illustrated in FIG. 11, the object recognition system 100 identified two of the processed videos or images as videos or images that include an airplane. As shown, the airplanes in the output videos or images 1115 and 1120 exhibit different angles, orientations, sizes, and locations. The object recognition system 100 is nevertheless able to identify each of the output videos or images 1115 and 1120 as including an airplane because the object recognition system 100 has been configured such that videos and/or images of an object generate an invariant representation of the object irrespective of the object's location, size, scale, and/or orientation within the videos or images.

Other applications of an object recognition system, such as, for example, the object recognition system 100 of FIG. 1, arise in the field of robotics. In one example, an object recognition system, such as object recognition system 100, embedded within a robot may enable a robot to identify various different objects and obstacles in a foreign environment, thereby assisting the robot as it attempts to navigate and maneuver within the foreign environment.

Additionally or alternatively, an object recognition system, such as object recognition system 100, embedded in a robot may enable a robot to locate (e.g., recognize) and fetch a desired object, such as, for example, a football. It is important to realize that the object recognition system 100 may not have been exposed to a football, or a series of time-varying images of a football, during the training process, and yet the object recognition system 100 still may be capable of recognizing a football. The objective of the training process is to establish connection patterns within the object recognition system 100 that enable the object recognition system 100 to recognize a wide variety of objects, not just those objects to which the object recognition system 100 is exposed during the training process. Such connection patterns may be established within the object recognition system 100 by exposing the object recognition system 100 to sequences of time-varying images of a collection of relatively simple shapes or objects, thereby arming the object recognition system with a vocabulary of primitive shapes or objects that enables the object recognition system 100 to recognize a variety of other (potentially more complex) shapes or objects. After the object recognition system 100 has been trained and the connection patterns have been established, the object recognition system 100 may be exposed to a single image of a football, and the resulting pattern of activity in the highest-level processing area of the object recognition system 100 may be identified as corresponding to a football. Thereafter, even though the object recognition system only has been exposed to a football once, the object recognition system is able to recognize subsequent exposures to footballs by remembering the pattern of activity generated in the highest level of the processing areas in response to the initial exposure to the football.

The systems and techniques described above are not limited to any particular hardware or software configuration. Rather, they may be implemented using hardware, software, or a combination of both. In addition, the methods and processes described may be implemented as computer programs that are executed on programmable computers comprising at least one processor and at least one data storage system. The computer programs may be implemented in a high-level compiled or interpreted programming language, or, additionally or alternatively, the computer programs may be implemented in assembly or other lower level languages, if desired. Such computer programs typically will be stored on computerusable storage media or devices (e.g., CD-Rom, RAM, or magnetic disk). When read into a processor of a computer and executed, the instructions of the programs may cause a programmable computer to carry out the various operations described above.

A number of implementations have been described. Nevertheless, it will be understood that various modifications may be made. For example, while the techniques have been discussed in terms of visual object recognition, the techniques may be applied in other settings where a temporal sequence of patterns all represent the same object in an abstract sense. Furthermore, useful results still may be achieved if steps of the disclosed techniques are performed in a different order and/or if components in the disclosed systems are combined in a different manner and/or replaced or supplemented by other components.

What is claimed is:

1. A computer-implemented method of object recognition, the method comprising:
    training simulated neural circuitry using sequences of images representing moving objects, such that the simulated neural circuitry recognizes objects by having the presence of lower level object features that occurred in temporal sequence in the images representing moving objects trigger the activation of higher level object representations;
    receiving an image of an object, the image including lower level object features; and
    recognizing the object using the trained simulated neural circuitry, wherein the trained simulated neural circuitry activates a higher level representation of the object in response to the lower level object features from the image,
    wherein the simulated neural circuitry includes simulated neuronal elements with local nonlinear integrative properties.

2. The method of claim 1, wherein the simulated neural circuitry includes elements having multiple input branches and training the simulated neural circuitry comprises:
    initializing connections between elements of the neural circuitry; and
    exposing the simulated neural circuitry to sequences of images representing moving objects,
    wherein the simulated neural circuitry is configured such that, as images of the objects simulate movement of the objects through a visual field of the simulated neural circuitry, consecutively active connections at a common input branch will be strengthened.

3. The method of claim 2, wherein the simulated neural circuitry is configured such that strengthening of connections jointly strengthens inputs which co-occur within a specified window in time.

4. The method of claim 3, wherein activity at one connection to the input branch causes effects on the input branch that remain active for a period of time spanning the duration of more than a single image in the sequence of images.

5. The method of claim 1, wherein the images represent movement of the objects between different starting and ending positions.

6. The method of claim 1, wherein the images represent rotation of the objects about one or more axes.

7. The method of claim 1, wherein the images represent dilation of the objects.

8. The method of claim 1, wherein a simulated neuronal element includes multiple input branches, one or more of which have local nonlinear integrative properties.

9. The method of claim 1, wherein the simulated neural circuitry is configured such that connections between different simulated neuronal elements have different temporal properties, with some weakening and some strengthening with repeated input of a given frequency.

10. The method of claim 8, wherein the simulated neural circuitry includes simulated neuronal elements configured to homeostatically regulate activity in the simulated neural circuitry.

11. The method of claim 1, wherein the simulated neural circuitry functions as a self-organizing content-addressable memory.

12. The method of claim 1, wherein:
    the simulated neural circuitry includes a simulated neuronal element represented as including multiple branches,
    a particular branch is configured to activate when the particular branch receives input that exceeds a first threshold, and
    the simulated neuronal element is configured to activate when a number of the simulated neuronal element's branches that are activated exceeds a second threshold.

13. The method of claim 12, wherein the simulated neural circuitry includes neuronal elements of different types.

14. The method of claim 12, wherein the simulated neural circuitry includes multiple processing areas, each of which includes multiple neuronal elements.

15. The method of claim 14, wherein the processing areas are arranged in a hierarchical series from a lowest processing area to a highest processing area and feed-forward is provided from outputs of the neuronal elements of one processing area to inputs of neuronal elements of a higher processing area.

16. The method of claim 15, wherein each higher processing area issues feedback to a lower processing area or areas.

17. The method of claim 14, wherein the neuronal elements include dendritic trees.

18. A computer program embodied on a non-transitory computer-readable medium, the computer program including instructions that, when executed, cause a computer to:
    train simulated neural circuitry using sequences of images representing moving objects, such that the simulated neural circuitry recognizes objects by having the presence of lower level object features that occurred in temporal sequence in the images representing moving objects trigger the activation of higher level object representations;
    receive an image of an object, the image including lower level object features; and
    recognize the object using the trained simulated neural circuitry, wherein the trained simulated neural circuitry activates a higher level representation of the object in response to the lower level object features from the image,
    wherein the simulated neural circuitry includes simulated neuronal elements with local nonlinear integrative properties.

19. The computer program of claim 18 wherein the simulated neural circuitry includes elements having multiple input branches, and the instructions that cause a computer to train the simulated neural circuitry comprise instructions that, when executed, cause a computer to:
    initialize connections to input branches of the elements of the neural circuitry; and
    expose the simulated neural circuitry to sequences of images representing moving objects,
    wherein the computer program further comprises instructions that, when executed, cause a computer to strengthen consecutively active connections at a common input branch as images of the objects simulate movement of the objects through a visual field of the simulated neural circuitry.

20. The computer program of claim of claim 19, wherein the instructions that, when executed, cause a computer to strengthen consecutively active connections at a common input branch include instructions that, when executed, cause a computer to jointly strengthen inputs which co-occur within a specified window in time.

21. The computer program of claim 18, wherein a simulated neuronal element includes multiple input branches, one or more of which have local nonlinear integrative properties.

22. The computer program of claim 18, wherein:
the simulated neural circuitry is configured such that connections between different simulated neuronal elements have different temporal properties, and
the computer program includes instructions that, when executed, cause a computer to weaken some connections and strengthen some connections in response to repeated input of a given frequency.

23. The computer program of claim 18, wherein:
the simulated neural circuitry includes a simulated neuronal element represented as including multiple branches, and
the computer program includes instructions that, when executed, cause a computer to:
activate a particular branch when the particular branch receives input that exceeds a first threshold, and
activate the simulated neuronal element when a number of the simulated neuronal element's branches that are activated exceeds a second threshold.

24. The computer program of claim 18 wherein:
the simulated neural circuitry includes processing areas arranged in a hierarchical series from a lowest processing area to a highest processing area, and
the computer program includes instructions that, when executed, cause a computer to provide feed-forward from outputs of the neuronal elements of one processing area to inputs of neuronal elements of a higher processing area.

25. The computer program of claim 24, wherein the computer program includes instructions that, when executed, cause a computer to issue feedback from each higher processing area to a lower processing area or areas.

26. An object recognition system comprising:
means for receiving images; and
simulated neural circuitry implemented by a processor or electronic circuitry for recognizing objects in received images, wherein the simulated neural circuitry is configured to:
during a training process in which sequences of images representing moving objects are exposed to the neural circuit, learn to recognize the objects by having the presence of lower level object features that occur in temporal sequence in the images representing the moving objects trigger the activation of higher level object representations; and
after the training process, recognize an object in a received image that includes lower level object features based on activating a higher level representation of the object in response to the lower level object features from the image,
wherein the simulated neural circuitry includes simulated neuronal elements with local nonlinear integrative properties.

27. The object recognition system of claim 26, wherein:
the simulated neural circuitry includes elements having multiple input branches; and
during the training process, the simulated neural circuitry is further configured to:
initialize connections to input branches of elements of the neural circuitry; and
strengthen consecutively active connections at a common input branch.

28. The object recognition system of claim 27, wherein the simulated neural circuitry is configured such that strengthening of connections jointly strengthens inputs which co-occur within a specified window in time.

29. The object recognition system of claim 26, wherein a simulated neuronal element includes multiple input branches, one or more of which have local nonlinear integrative properties.

30. The object recognition system of claim 26, wherein the simulated neural circuitry is configured such that connections between different simulated neuronal elements have different temporal properties, with some being configured to weaken and some being configured to strengthen with repeated input of a given frequency.

31. The object recognition system of claim 26, wherein the simulated neural circuitry functions as a self-organizing content-addressable memory.

32. The object recognition system of claim 26, wherein:
the simulated neural circuitry includes a simulated neuronal element represented as including multiple branches,
a particular branch is configured to activate when the particular branch receives input that exceeds a first threshold, and
the simulated neuronal element is configured to activate when a number of the simulated neuronal element's branches that are activated exceeds a second threshold.

33. The object recognition system of claim 26, wherein:
the simulated neural circuit includes multiple processing areas having multiple neuronal elements, the processing areas being arranged in a hierarchical series from a lowest processing area to a highest processing area; and
the simulated neural circuit is configured to provide feed-forward from outputs of the neuronal elements of one processing area to inputs of neuronal elements of a higher processing area.

34. The object recognition system of claim 33, wherein each higher processing area is configured to issue feedback to a lower processing area or areas.

35. The object recognition system of claim 33, wherein the neuronal elements include dendritic trees.

36. A computer-implemented method for training simulated neural circuitry having at least a first processing area and a second processing area to achieve invariant object recognition, wherein the first processing area and the second processing area include simulated neuronal elements, the method comprising:
initializing connections between simulated neuronal elements of the first processing area and simulated neuronal elements of the second processing area;
receiving, at the simulated neural circuitry, a series of different images of an object;
in response to receiving the different images of the object, generating initial encoded representations of the object in the first processing area by activating one or more of the simulated neuronal elements of the first processing area for each received image of the object;

transmitting the initial encoded representations of the object from the first processing area to the second processing area by transmitting signals from active simulated neuronal elements of the first processing area to the simulated neuronal elements of the second processing area to which the active simulated neuronal elements of the first area are connected; and strengthening connections to an individual simulated neuronal element of the second processing area when the connections to the individual simulated neuronal element of the second processing area are consecutively active.

37. The method of claim 36, wherein strengthening connections to an individual simulated neuronal element of the second processing area when the connections to the individual simulated neuronal element of the second processing area are consecutively active includes strengthening connections to the individual simulated neuronal element of the second processing area when the connections to the individual simulated neuronal element of the second processing area are active within a specified window of time.

38. A computer-implemented method for recognizing an object in an image comprising:

receiving an input image of an object at simulated neural circuitry that includes a hierarchy of processing areas and that has been trained to recognize one or more objects;

in response to receiving the input image of the object, generating an initial encoded representation of the object;

transforming the initial encoded representation of the object into an invariant output representation of the object by propagating the initial encoded representation of the object through the hierarchy of processing areas, wherein representations of the object generated in each succeeding processing area are increasingly less variant than the initial encoded representation; and recognizing the object based on the invariant output representation of the object, wherein the simulated neural circuitry includes simulated neuronal elements with local nonlinear integrative properties.

39. The method of claim 38, wherein a simulated neuronal element includes multiple input branches, one or more of which have local nonlinear integrative properties.

40. The method of claim 38, wherein the simulated neural circuitry functions as a self-organizing content-addressable memory.

41. The method of claim 38, wherein:

the simulated neural circuitry includes a simulated neuronal element represented as including multiple branches, a particular branch is configured to activate when the particular branch receives input that exceeds a first threshold, and the simulated neuronal element is configured to activate when a number of the simulated neuronal element's branches that are activated exceeds a second threshold.

42. A computer-implemented method for searching for images of an object, the method comprising:

receiving a sequence of images of an object at simulated neural circuitry;

training the simulated neural circuitry using the sequence of images to generate an encoded representation of the object, wherein the encoded representation of the object includes a higher level feature triggered by recognizing a temporal sequence of lower level features of the object during the training;

searching a corpus of images by supplying each image of the corpus to the simulated neural circuitry; and designating images from the corpus of images as being images of the object when an output of the simulated neural circuitry produced as a result of an image being supplied to the simulated neural circuitry matches the encoded representation of the object to within a predetermined threshold, wherein the simulated neural circuitry includes simulated neuronal elements with local nonlinear integrative properties.

43. The method of claim 42, wherein the sequence of images comprises a video of the object.

44. The method of claim 43, wherein a simulated neuronal element includes multiple input branches, one or more of which have local nonlinear integrative properties.

45. The method of claim 43, wherein the simulated neural circuitry includes simulated neuronal elements configured to regulate excitation levels and synaptic connection strengths.

46. The method of claim 43, wherein the simulated neural circuitry functions as a self-organizing content-addressable memory.

47. The method of claim 43, wherein:

the simulated neural circuitry includes a simulated neuronal element represented as including multiple branches, a particular branch is configured to activate when the particular branch receives input that exceeds a first threshold, and the simulated neuronal element is configured to activate when a number of the simulated neuronal element's branches that are activated exceeds a second threshold.

* * * * *